United States Patent [19]

Miller

[11] 4,124,347
[45] Nov. 7, 1978

[54] APPARATUS FOR FORMING SYNTHETIC LOGS

[76] Inventor: James F. Miller, P.O. Box 1142, Yakima, Wash. 98907

[21] Appl. No.: 704,932

[22] Filed: Jul. 13, 1976

[51] Int. Cl.² .................................................. B29D 23/04
[52] U.S. Cl. ........................................ 425/208; 366/90; 425/191; 425/381; 425/404; 425/466; 425/467; 425/812
[58] Field of Search ............... 425/207, 208, 209, 190, 425/191, 192, 380, 381, 381.2, 466, 467, 404, 79, 72 R, 812, 203; 259/191, 192, 193; 264/176 R; 198/625; 100/145-150; 222/412; 366/79, 90

[56] References Cited

U.S. PATENT DOCUMENTS

| 2,984,173 | 5/1961 | Roche et al. | 425/466 X |
| 3,230,902 | 1/1966 | Grimm et al. | 425/208 |
| 3,387,331 | 6/1968 | Billings | 425/192 |
| 3,687,423 | 8/1972 | Koch et al. | 425/208 X |
| 3,829,270 | 8/1974 | DeBonth et al. | 425/381.2 |
| 3,897,184 | 7/1975 | Woodburn et al. | 425/79 |
| 3,914,085 | 10/1975 | Kruelskie | 425/466 X |
| 3,989,433 | 11/1976 | Furman | 425/466 X |

FOREIGN PATENT DOCUMENTS

| 1,254,859 | 11/1967 | Fed. Rep. of Germany | 425/208 |
| 1,283,496 | 11/1968 | Fed. Rep. of Germany | 425/467 |
| 49,780 | 8/1966 | German Democratic Rep. | 425/191 |

Primary Examiner—Francis S. Husar
Assistant Examiner—Mark Rosenbaum
Attorney, Agent, or Firm—Burns, Doane, Swecker & Mathis

[57] ABSTRACT

A log forming apparatus includes a slotted die chamber, a rotary feed auger for advancing loose particles into the die chamber, and a replaceable tip having a pressure face for engaging successive layers of particles from the auger and pressing these layers together into the shape of a log. The pressure face comprises a plurality of semi-circular grooves for forming ridges in each layer of particles which are pressed within corresponding grooves of a preceding layer during compaction. A mandrel extends axially forwardly of the pressure face and forms an axial bore through the log to facilitate the removal of heat and steam therefrom. The mandrel is hollow to direct a flow of compressed air through the bore to further facilitate such removal. The auger comprises an interrupted helical screw thread for providing a sensitive advancement of loose particles forwardly along a helical feed channel defined by the screw thread. The feed channel includes a forward discharge scoop of substantially constant volume. A clamp enables the slotted die chamber to be compressed to increase the backpressure applied to the log. A cooling/drying section comprises pressurized walls forming a log-conducting trough. An adjustment mechanism enables the pressure between the walls to be varied so as to alter the magnitude of the lateral forces which are applied to the log.

18 Claims, 7 Drawing Figures

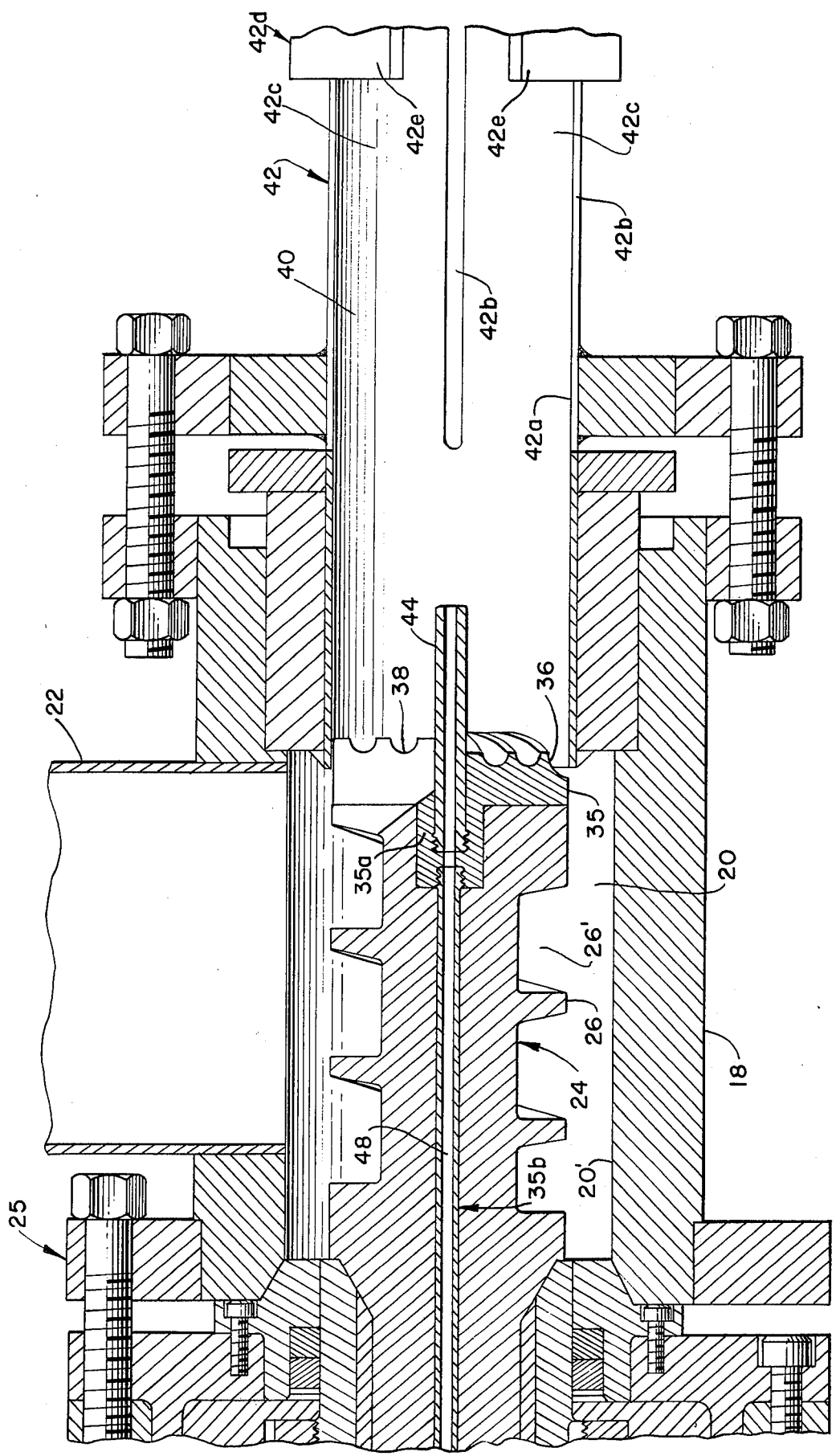

APPARATUS FOR FORMING SYNTHETIC LOGS

BACKGROUND AND OBJECTS OF THE INVENTION

This invention relates to the fabrication of synthetic logs by the compaction and interbonding of particles, particularly organic particles containing natural ligno-cellulosic resins.

The production of synthetic fireplace logs from organic particles such as sawdust, peanut hulls, vegetable fiber, etc. has been heretofore proposed. Attention is directed to U.S. Pat. No. 1,873,596 issued Aug. 23, 1932 to Jones; U.S. Pat. No. 1,990,631 issued Feb. 12, 1935 to Bowling; U.S. Pat. No. 3,227,530 issued Jan. 4, 1966 to Levelton; U.S. Pat. No. 3,240,573 issued Mar. 15, 1966 to Eyre, Jr.; and U.S. Pat. No. 3,506,415 issued Apr. 14, 1970 to Paladino, for examples of proposals in this area. In a typical operation, organic particles are initially compacted by a tapered auger during conveyance toward a die cavity. At the front of the auger, a pressure face is provided in which there is formed a narrow feed slot leading to the die cavity. A cutting edge adjacent the slot cuts the compacted particles into a narrow ribbon which is fed into the die chamber. The ribbon enters the die chamber in helical form and is engaged from behind by the pressure face such that successive layers of the ribbon are pressed together into the shape of a log. Aligned axially with the auger is an abutment head which abuts a front end of the log and applies a backpressure which resists advancement of the log, and causes the layers to become compacted together. In order to sever the log into segments, it is necessary that a time consuming retraction of the abutment head be performed, that spindle rotation be stopped and that a die wheel be indexed to the next position.

One of the more serious problems that has been previously encountered during operation of log forming machines concerns the generation of heat and steam. Excessive heat can char the organic particles, and steam trapped within the log can actually cause the log to explode. Heat and steam build-up has previously been facilitated by the use of tapered feed augers whose screw threads lie closely adjacent the surrounding housing walls. Consequently, there exists a tendency for back-ups to occur in the feeding system which generate high levels of heat as well as excessive initial compaction by the pressure face. Such action frequently results in equipment damage. Further heat generation can be caused as the compressed particles are cut into a narrow ribbon at the feed slot. Actually, when the cutter edge adjacent the feed slot becomes dull, horsepower consumption is raised and the rate of heat production increases dramatically. The high levels of heat generation not only can cause charring and explosion of the logs, but also necessitate the use of a high capacity cooling system to alleviate overheating conditions.

It is, therefore, an object of the present invention to provide methods and apparatus for more effectively producing logs from loose organic particles.

It is another object of the invention to provide methods and apparatus for producing logs from loose organic particles, which minimize the generation of heat and steam.

It is a further object of the invention to provide novel methods and apparatus for the continuous production of logs from organic particles at varying degrees of compaction.

BRIEF SUMMARY

These objects are achieved by a log forming apparatus including a slotted, pressure regulated die chamber, a rotary feed auger for advancing loose particles to the die chamber, and a replaceable tip at a forward end of the auger having a pressure face for engaging successive layers of particles from the auger and compacting these layers together into the shape of a log. The pressure face comprises a plurality of semi-circular grooves for forming ridges in each layer of particles which are pressed within corresponding grooves of a preceding layer during compaction. A mandrel extends axially forwardly of the pressure face and forms an axial bore through the log to facilitate the removal of heat and steam therefrom. The mandrel is hollow to direct a flow of compressed air through the bore to further facilitate such removal. The auger comprises an interrupted helical screw thread for advancing the loose particles forwardly along a helical feed channel defined by the screw thread. The feed channel includes a forward scoop section communicating with the die chamber. The feed channel, including the scoop section, is of substantially constant volume. A clamp enables the slotted die chamber to be compressed to increase back-pressure applied to the log. A cooling/drying section comprises pressure adjustable walls forming a log-conducting trough. An adjustment mechanism enables the pressure between the walls to be varied so as to alter the magnitude of lateral forces which are applied to the log.

DESCRIPTION OF THE DRAWINGS

A preferred embodiment of the invention is illustrated in the accompanying drawings in which:

FIG. 7 is a longitudinal sectional view through the feed auger and die chamber portions of the log-forming mechanism according to the present invention.

DETAILED DESCRIPTION

Figure 1:
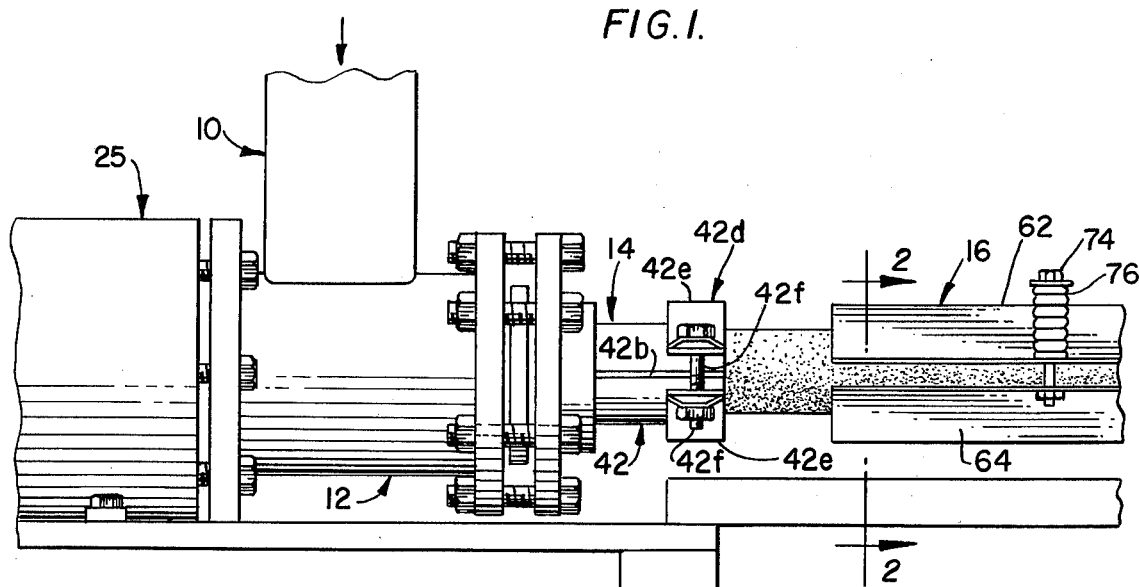
FIG. 1 is a side elevational view of a log-forming mechanism in accordance with the present invention.
Figure 2:
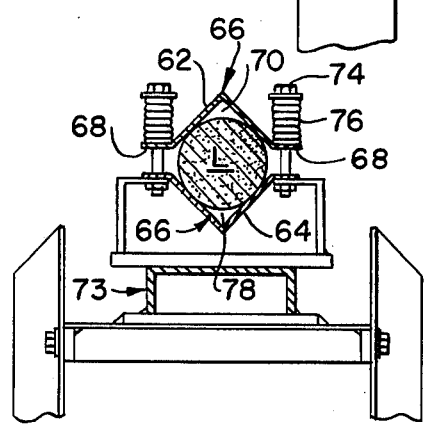
FIG. 2 is a cross-sectional view through a cooling/drying section of the log-forming mechanism taken along line 2—2 of FIG. 1.

In FIG. 1 there is depicted the preferred embodiment of a mechanism 10 for pressing organic particles into the shape of a log according to the present invention. This mechanism 10 includes a feed section 12, a shaping section 14, and a cooling/drying section 16.

Figure 3:
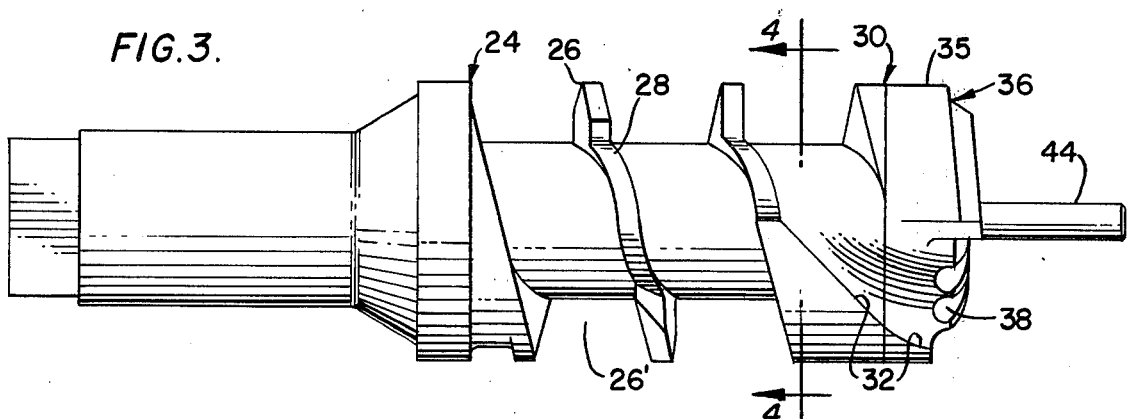
FIG. 3 is a side elevational view of a feed auger utilized in accordance with the present invention.
Figure 4:
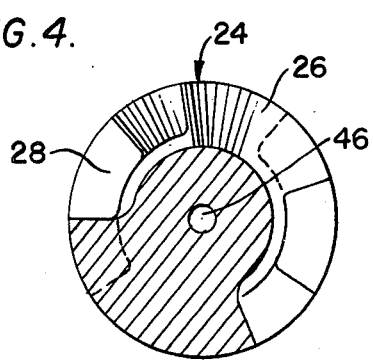
FIG. 4 is a cross-sectional view through the feed auger taken along line 4—4 of FIG. 3.

The feed section 12 includes a housing 18 within which is formed a cylindrical passage 20 (FIG. 7). A chute 22 communicates with the passage 20 and is adapted to conduct thereto organic particles, such as sawdust, shredded peanut hulls, vegetable fiber, and other organic particles preferably of the type which contain natural ligno-cellulosic resins. Disposed within the cylindrical passage 20 is a feed auger 24. The feed auger 24 is mounted in conventional fashion to a rotary drive mechanism 25 partially depicted in FIG. 7. The auger includes a helical screw thread 26 which feeds loose particles forwardly through the feed passage 20. The screw thread 26 is of constant diameter and forms a helical feed channel 26' of constant volume. The outer periphery of the screw thread is disposed well inwardly of the side wall 20' of the feed channel 20. The screw thread 26 is discontinuous, i.e., it is interrupted periodically along its helical extent by gaps 28 as shown in FIG. 3. These gaps are relief slots that prevent particle compaction in the feed passage 20 and thus provide sensitivity to the feeding of loose particles.

The feed channel 26' terminates in a forward discharge section 30 which is formed by a generally helical surface 32. The arrangement is such that helical surface 32 acts as a scoop to pick up and move loose particles forwardly.

Figure 5:
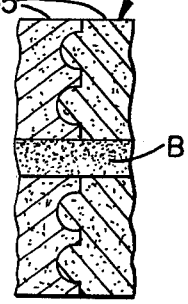
FIG. 5 is a fragmentary longitudinal sectional view of a log produced by the present invention, illustrating a ridge-groove interlocking structure formed therein.
Figure 6:
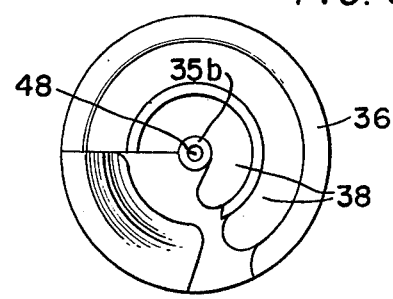
FIG. 6 is a front view of the feed auger.

At the front of the auger is mounted a replaceable tip 35 having a pressure face 36. The tip 35 has a tongue portion 35a which is received within a recess at the front of the auger 24 and secured thereto by a longitudinal bolt 35b. The diameter of the pressure face 36 is substantially equal to the diameter of the screw thread 26. Viewed from in front, the pressure face 36 occupies about three quarters of the front of the auger 24, that is, it extends about 270° from one side of the scoop 32 to the other (FIG. 5). The pressure face is generally helical in nature, having a helix angle which is less than that of the screw thread 26. As loose particles are discharged from the scoop 32, they are engaged from behind by the pressure face 36 and urged forwardly thereby.

The pressure face 36 includes a series of inwardly recessed grooves 38. These grooves have curved generally U-shaped configuration, preferably of semi-circular shape in cross section (FIG. 7). These grooves are radially spaced and, due to the helical nature of the pressure face 36, extend helically forwardly from one side of the discharge section 30 to the other.

The auger communicates with a cylindrical die chamber 40 formed by a cylindrical slotted, pressure controlled die portion 42 of the shaping section 16. Particles which leave the scoop 32 are pressed together and pushed forwardly within the die chamber by the pressure face 36. Therefore, it will be realized that a continuous helical flow of particles is emitted from the auger 24, with axially successive layers 45 thereof being pressed against one another in the form of a log L within the die chamber 40.

The grooves 38 of the pressure face 36 cause successive layers of particles to be formed with a controlled shape, with the ridges of one layer being received within the corresponding grooves formed in a preceding layer (FIG. 5). In this fashion, the successive layers are mechanically pressed and interlocked within one another to form an increased area of bonding surface. The use of narrow helical V-shaped grooves at the front of a pressure face has previously been proposed, but the configuration of the present invention provides a greater degree of interlocking due to the markedly increased cross sectional area of the grooves.

The die portion 42 is formed by a housing 42a having a plurality of longitudinal slots 42b therein. Preferably, there are four of such slots 42b equally spaced to divide the die housing into four flexible sections 42c. A clamp 42d includes upper and lower portions 42e which, upon tightening or loosening of spring biased bolts 42f, are contracted or expanded to alter the lateral pressure exerted on the log. In this manner, the backpressure exerted upon the log and hence the density of the log particles can be regulated as desired by adjusting the pressure exerted by the clamp.

Due to the high rate of rotation of the auger 24 and the pressure face 36, frictional contact between the pressure face and the particles produces substantial heat conditions in the region of the pressure face 36. Such heat and pressure are sufficient to express the natural ligno-cellulosic resins of the organic particles. When the log eventually cools and dries, this resin hardens and forms a firm, rigid log.

Projecting axially forwardly of the pressure face 36 is a hollow mandrel 44. During formation of a log, the mandrel 44 forms a bore B axially through the log. This bore aids in the removal from the log of heat, steam and various vapors which are continuously formed during production. To further aid in such removal, compressed air can be ejected through the mandrel via a channel 48 passing axially through the bolt 35b to blow heat and steam from the log.

Escape of heat and steam is further facilitated by the provision of the elongate slots 42b in the die chamber 42 which is open to the surrounding atmosphere.

The die chamber 40 can be made as long as desired by lengthening the slotted die housing 42a.

By varying the length and clamp pressure of the die chamber 40 the density, or degree of compaction, of particles forming the log can be controlled. This is possible because the log frictionally contacts the side walls of the die chamber as it is advanced toward the cooling section 16. Thus, a greater area of frictional contact plus increased die clamp pressure creates a greater backpressure resisting log advancement, and, hence, produces a greater compaction of particles in the final log product.

Additional adjustment of log density is afforded by the cooling/drying section 16. The cooling/drying section 16 is longitudinally spaced from the end of the die 42, so that the log passes unobstructedly from the die into the cooling/drying section 16.

The cooling/drying section 16 includes a pair of upper and lower elongate plates 62, 64. Each plate 62, 64 includes a right angle portion 66 and a pair of ears 68. The plates 62, 64 are oriented with their ears parallel, and with the right angle portions 66 defining a rectangular trough 70. A plurality of bolts 74 interconnect the ears 68 to couple the plates 62, 64 together and to a rigid frame structure 73. The bolts 74 are adjustable to vary the loading between the plates. In this fashion, the lateral pressure acting upon the side of a log L passing through the trough can be varied by adjusting the bolts 74. Moreover, because of the difference in cross sectional shape of the log and trough, when the log L travels through the trough 70 there exist air passages 78 between the plates 62, 64 and the log L through which cooling air can be circulated to cool and set the log. Air can be generated by any suitable blower or suction mechanism.

The upper plate 62 is yieldable relative to the lower plate 64 due to the presence of coil springs 76 disposed between the upper plate 62 and the bolts 74. Thus, the chances of a log becoming jammed within the trough are minimized. It will be realized that the pressure controlled split die 40 and the laterally adjustable plates 62, 64 enable the backpressure to be altered, without interfering with the ultimate discharge of the log from the mechanism 10 upon leaving the cooling trough 70. This allows effective log production to be carried out continuously.

OPERATION

In operation, organic particles are introduced through the chute 22 and into the feed passage 20. The auger 24 conveys the loose particles to the die chamber 40. Thereupon, the particles are acted upon from behind by the pressure face 36 and are advanced thereby. Thus, particles are emitted from the auger 24 in the form of a continuous spiral, with the successive axial layers 45 thereof being compressed against one another by the pressure face 36. The grooves 38 of the pressure face 36 mechanically interlock the successive layers by means of ridge and groove connections which increase bond area in the cross section of the log. As the log is formed, an axial bore is established therethrough by the mandrel 44 so that heat, steam, and other vapors can be removed from the log. Compressed air can be blown through the mandrel and through the bore of the log to aid in such removal. Heat can also escape through the slots 42b in the die chamber. The advancing log then enters the cooling trough 70 wherein cool air can be blown through the passages 78 to cool and set the log. The degree of compaction of the log can be controlled by adjustment of the split die clamps 42 and the bolts 74 so as to alter the lateral pressures applied to the log.

It will be realized that during log production, the logs are subjected to only minimal internal pressures due to the efficient way in which heat, steam and other vapors can be removed from the log via the central bore formed by the mandrel 44.

The present invention involves not only efficient heat removal, but also involves minimal heat generation. This results from a novel feeding of the loose particles by a discontinuous feed screw wherein the particles are fed only forwardly, i.e. no backpressure is generated, and wherein the only significant heat generation occurs at the pressure face 36. Enough heat and pressure can be generated at the pressure face 36 to express the natural ligno-cellulosic resins from the particles.

The laterally adjustable plates 62, 64 and adjustable split die 42b function to regulate the degree of compaction of the log, without obstructing removal of the log from the machine. Thus, the inconvenience of having to remove an abutment head in order to discharge the log is avoided. This expedient is effectively incorporated within a cooling trough wherein the plates 62, 64 have point contact with the log, and yet provide air passages 78 for conducting cooling along the log periphery. Since relatively little heat is generated by the machine, such air passages exhibit sufficient cooling capacity.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

I claim:

1. A log-forming apparatus comprising
    a feed passage,
    a die chamber communicating with the forward end of said feed passage,
    a feed auger disposed in said feed passage and having a helical screw flight for advancing loose particles along a feed channel formed by said screw-flight toward said die chamber;
    said feed channel including a forward scoop section communicating with said die chamber,
    said feed channel, including said scoop section, being of substantially constant volume; and
    a replaceable tip at a forward end of said auger,
    said tip including a forwardly facing pressure face for pressing the loose particles together into the shape of a log within said die chamber;
    said helical screw flight including interruptions therealong to resist the formation of heat-generating backpressures in said feeding channel.

2. Apparatus according to claim 1 further comprising a mandrel projecting axially from said pressure face for forming an axial bore through the log.

3. Apparatus according to claim 2 including air passage means communicating with said mandrel for introducing pressurized air into said bore.

4. Apparatus according to claim 2 wherein said die chamber is formed by a cylindrical housing; said housing including a plurality of longitudinal slots dividing the housing into sections; and clamp means around said slotted housing for compressing said sections together to increase the lateral pressure applied to the log.

5. Apparatus according to claim 1 wherein said pressure face includes forwardly opened, helically extending grooves in a direction axially of the auger and extending angularly approximately 270° around the front of said tip;
    said grooves each having a semi-circular cross-section configuration for forming successive layers of material into interlocking shapes.

6. Apparatus according to claim 5 further including cooling/drying means located adjacent to and in alignment with said die chamber; said cooling/drying means comprising spaced apart walls forming a log conducting passage; the spacing between said walls being adjustable, and means operatively associated with said walls for reducing such spacing to increase the lateral forces applied to the log.

7. Apparatus according to claim 6 wherein said log-conducting passage is of different cross-sectional configuration than the log to establish air channels along the periphery of said log for conducting cooling/drying air.

8. Apparatus according to claim 1, said pressure face having a diameter substantially equal the diameter of said screw flight; and,
    said pressure face extending helically forward from one side of said scoop section to the other; and,
    said helically extending pressure face including grooves extending from one side of said scoop section to the other, said grooves having a semi-circular cross-sectional configuration.

9. The apparatus according to claim 8 wherein the helix angle of said pressure face is less than the helix angle of said screw flight.

10. The apparatus according to claim 8 wherein said grooves are concentrically disposed on said helically extending pressure face and said grooves extend helically in the axial direction of the auger.

11. Apparatus according to claim 1 further including back pressure means operatively associated with said die chamber for resisting advancement of said log to cause compaction of said particles; said back pressure means comprising laterally adjustable log-conducting means for guiding said log and applying laterally directed forces against the periphery of said log to frictionally resist advancement thereof, means associated with said back pressure means for venting said back pressure means to facilitate the removal of heat and vapors from the log and means operatively associated with said log-conducting means for adjusting said log-conducting means to vary the lateral forces applied to said log.

12. Apparatus according to claim 11 wherein said log-conducting means comprises a die which receives pressed particles from said pressing means; said die including a cylindrical housing having a plurality of circumferentially spaced longitudinal slots formed therein to divide said housing into cantilevered sections; and means operatively associated with said log-conducting means for drawing said sections together to increase the lateral forces applied to said log, said slots providing said venting means.

13. Apparatus according to claim 11 wherein said log-conducting means comprises spaced trough-forming walls aligned with said die chamber; the channel formed by said walls having a different cross-sectional shape than that of said log to provide air passages between the log and said walls for conducting cooling air along the periphery of the log.

14. In a log-forming apparatus of the type including a die chamber; a rotary feed auger operatively associated with said die chamber for advancing loose organic particles into said die chamber; a pressure face at a forward end of said auger defining a scoop section for engaging successive layers of particles emitted from said auger and compacting said layers together into the shape of a log; said pressure face having a plurality of inwardly released grooves for forming ridges in each layer of particles which are pressed within corresponding grooves of a preceding layer during compaction, the improvement wherein said grooves each have a semi-circular cross-sectional configuration to form ridges of similar cross-sectional configuration.

15. Apparatus according to claim 14 wherein said feed channel, including said scoop section, is of substantially constant volume; said pressure face extending helically about 270° with a helix angle less than the helix angle of said feed channel.

16. Apparatus according to claim 14 and further including a mandrel projecting forwardly of said pressure face to form an axial bore through a log being produced.

17. Apparatus according to claim 16 wherein said mandrel is hollow and communicates with a channel in said auger to enable the ejection of compressed air into the bore of said log to facilitate the removal of heat and steam.

18. In a log-forming apparatus of the type including a rotary feed auger for delivering loose particles to a die chamber in which such particles are compacted into the shape of a log, said auger comprising:
a helical screw thread for advancing said loose particles forwardly along a helical feed channel defined by said screw thread;
said feed channel including a forward scoop section communicating with said die chamber;
said feed channel, including said scoop section being of substantially constant volume;
a replaceable tip at the front of said auger, said tip including a forwardly facing pressure face having a diameter substantially equal to the diameter of said screw thread and extending helically forwardly from one side of said scoop section to the other; and,
said screw thread including interruption-forming gaps along its helical extent, to essentially eliminate pressure build-ups during particle feeding.

* * * * *